United States Patent Office.

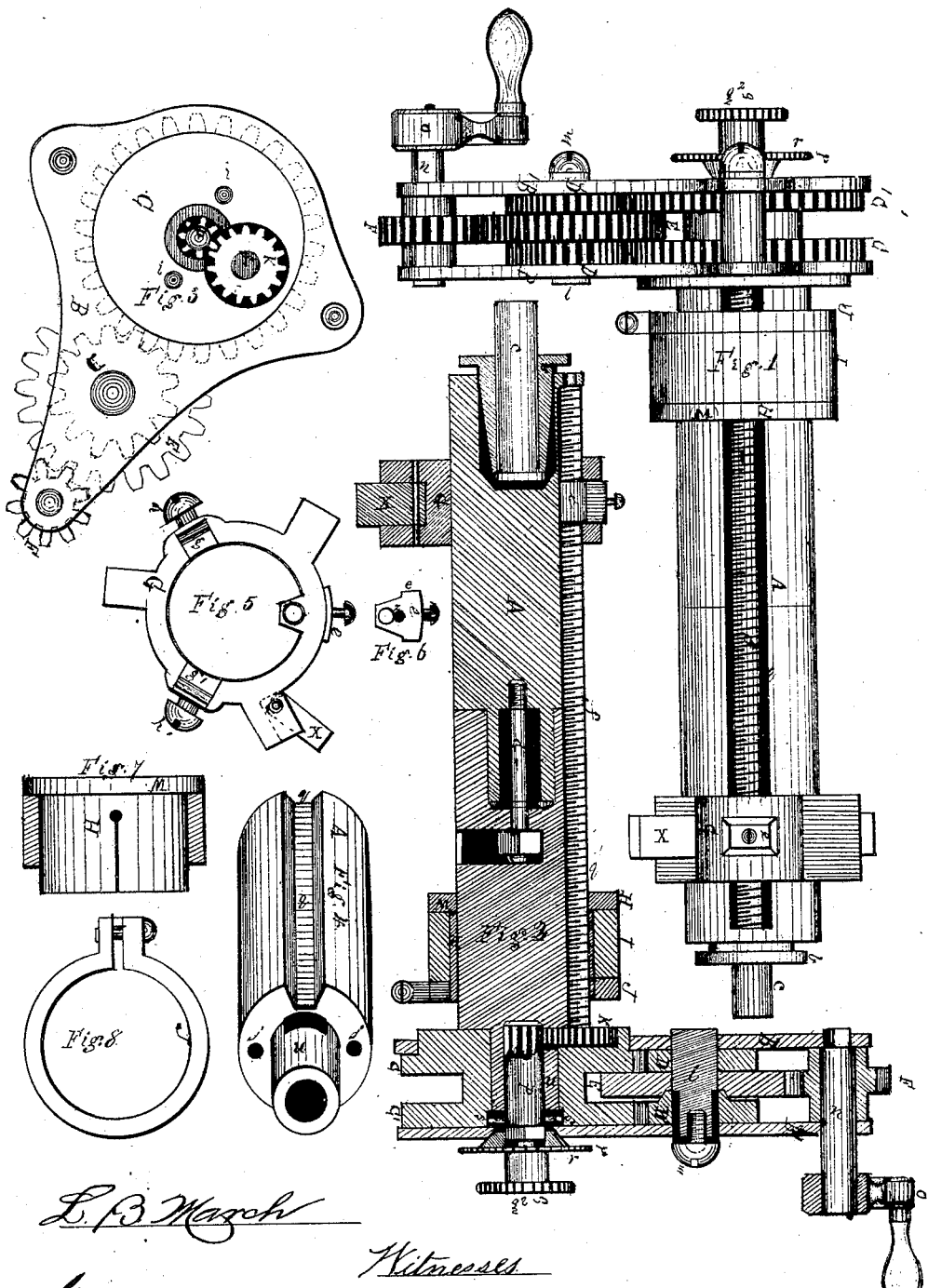

JEROME WHEELOCK, OF WORCESTER, MASSACHUSETTS.

Letters Patent No. 108,310, dated October 11, 1870.

IMPROVEMENT IN BORING APPARATUS.

The Schedule referred to in these Letters Patent and making part of the same.

*To all whom it may concern:*

Be it known that I, JEROME WHEELOCK, of the city and county of Worcester, in the State of Massachusetts, have invented certain new and useful Improvements in Boring Apparatus.

My invention relates to that class of tools known as boring-bars, and is intended for the reboring or turning out of steam-engine cylinders, or other similar chambers permanently located.

My invention consists in certain novel features in the construction and arrangement of mechanism, and my object has been to produce a boring apparatus possessing a greater degree of general utility, and capable of more perfect results in its operation, than has heretofore been accomplished to my knowledge; and I do hereby declare that the following specification, taken in connection with the drawing furnished and forming a part of the same, is a true, clear, and exact description thereof.

The several parts are designated by the same letters of reference in all the figures.

Figure 1 represents one of my improved boring-bars in elevation.

Figure 2 represents the same in longitudinal section.

The other figures will be referred to as requirement occurs in the description.

A is the bar proper. It is exhibited as round in this instance, and made in two lengths, capable of being readily joined together in any of the well-known modes. I prefer the mortised joint-bolt, as shown in the drawing, although a spindle-dowel and set-screw will serve an excellent purpose.

B and B' are matched face-plates, between which the driving mechanism is mounted. They are connected together by means of screw-studs. In fig. 3 will be found a rear view of the plates, with the intermediate gearing detached from the bar. The inner plate B, at its broad end, embraces, with a circular opening, an annular shoulder on the inner face of one of the large gears G, while the plate B' is provided with a corresponding but smaller opening, for the insertion of the feed-spindle, hereafter described. The plates are also provided with corresponding bearings, for the reception of a crank-shaft and gear-stud.

C and C' represent a solid gear-wheel, having two separate toothed members. It may be described as an ordinary thick gear, having a deep channel cut in the center of its toothed periphery, so that it has the appearance of two gear-wheels of same size and character.

This double gear is mounted upon a shouldered end, $n$, of the bar A, and is doweled thereto at points marked $jj$, fig. 4.

D, D', and E are connecting-gears, between the driving-gear F, on the crank-shaft $n$, and the bar-gears C and C'.

The gears D and E are securely mounted, side by side, upon a stud, $l$, sustained in suitable bearings cut in the plates B and B'.

The gear D' is of the same size and character of gear D, and is loosely mounted upon the stud $l$ on the opposite side of gear E.

The gear D' is provided with an outward-projecting flange or sleeve, which extends slightly beyond the end of the stud $l$, on which the gears are mounted.

A broad-headed screw, $m$, enters the end of the stud, and, when the screw is turned fully in, its head bears upon the projecting flange of the gear D', and binds the three gears and the stud firmly together. This arrangement is for the purpose of preventing any play between the teeth of the gears D and C, and also to, from time to time, compensate for any wear which is liable to occur, the same being accomplished by setting the gear D' backward or forward of the tooth-line of the others, so as to bear upon both sides of the teeth of the engaging gears.

G is the cutter-head, exhibited in detail in fig. 5. It is mounted upon the bar A, and fitted thereto. It is provided with three projections on its periphery, to each of which is hinged a cutter-block, X, to which the cutters are attached in any of the ways well known to the arts. These blocks should be closely fitted at their hinge-joints or journals, on which they are mounted, in order to prevent their forward movement, except under positive pressure.

This manner of hinging of the cutter-blocks constitutes a prominent feature of my invention. After turning out a cylinder, it is sometimes necessary to withdraw the cutters, which, as bars have heretofore been constructed, cannot well be done without scratching or scoring the surface just turned. After completing the turning operation with this improved cutter-head, it is only necessary to knock the hinged cutter-blocks forward, which withdraws the cutters from contact with the metal, and admits of the ready withdrawal of the cutter-head.

Set-screws $h\ h'$ engage with gibs $g$ and $g^1$, for the purpose of securing an even and steady bearing of the cutter-head on the bar.

An inward-projecting lug, V, on the cutter-head enters and closely fits a longitudinal groove, $q$, in the bar A. The particular form of this groove $q$ and the corresponding lug V on the head G constitutes one feature of my invention. The groove $q$ has beveled sides, its top being wider than the bottom. The lug V, being of a corresponding wedge-shape, is constantly made to engage closely with the sides of the groove by the drawing action of the set-screws $h$ and gibs $g$, by which means the attendant wear from contact of the parts will be constantly compensated, and the fault known as "chattering" practically obviated.

The cutter-head G is connected with a screw-feed rod, $f$, which extends the entire length of the groove $q$ in the bar A by means of a nut, $e$, fitted into a slot cut in the face of the head G, which extends inward through the lug V, and corresponds therewith in form.

There is a hole in the lug V, through which the screw-feed rod $f$ passes freely, and enters the nut $e$, fig. 6, when placed in the slot, thus forming a connection between the feed-rod and cutter-head.

As the nut $e$ is liable to wear, and hence to allow play between it and the feed-screw $f$, I have placed therein a threaded gib, $z$, as shown in fig. 6, by means of which a close connection between the nut and screw may be maintained.

The mode of connecting the feed-screw with the cutter-head, and also the mode of maintaining the close connection between the nut $e$ and the screw $f$, as described, constitute, in this combination, distinct features of my invention.

The cutter-head is moved longitudinally on the bar by the revolution of the feed-screw, which is effected as follows:

On the end of the feed-screw $f$ is a gear, K, for which is provided a recess in the body of the double gear C.

The main end of the bar A (see fig. 4) has a projecting member, $u$, which is drilled out, forming a cylindrical chamber of the length of the projection.

A slot is cut in the periphery of the member $u$, adjacent to the groove $q$, which communicates with the recess within.

The gear K on the screw $f$ enters the slot and the interior recess.

A spindle, $p$, having a gear at its inner end, enters the recess, its gear engaging with the gear K.

The outer end of the spindle $p$ is squared, and projects, but cannot pass through the hole in the face-plate B′ on account of the pins $s\ s$.

A friction-plate, $r$, is provided with a square hole, corresponding to the square end of spindle $p$, and also an inward circular projection, filling the hole in the face-plate B′, surrounding the spindle.

A tightening-screw, $g^2$, enters the end of the spindle $p$, and, by turning up the same, the spindle and friction-plate are not only drawn together, but both are connected with the face-plate B′; therefore, the face-plates, being mounted upon the gears C C′, will, if turned thereon, leave the bar A stationary, but, mean time, by turning the spindle $p$, would cause the gear K on the feed-rod $f$ to revolve in the opposite direction, and to move the cutter-head longitudinally.

The operation of the portion of my apparatus already described will be readily understood. The turning of the crank-shaft operates the train of gears which revolve the bar and cutter-head, while, at the same time, the turning of the face-plates B causes the cutter-head to traverse the bar longitudinally. By slackening up the tightening-screw $g^2$, the face-plates and gearing may be revolved without imparting motion to the spindle $p$ and feed-screw $f$; and, also, when thus slackened, the friction-plate may be turned, and thereby operate the spindle $p$ and feed-screw $f$ without movement of the face-plates and gearing.

The manner of using an apparatus, generally, like that already described in turning or boring out the cylinder of a steam-engine is well known to the art. It often occurs that the cylinders of steam-engines are placed so near the walls of the engine-room that a bar of ordinary length could not be inserted for operation. It is for this reason that I have made the bar in two pieces, capable of being firmly joined after entering the cylinder.

I will now proceed to describe certain novel arrangement and construction of elements which constitute additional features in my invention.

Boring-bars, as ordinarily heretofore constructed, have been provided with fixed centers, or, having a fixed bearing at one end, have an adjustable collar-bearing at the other. My apparatus is provided with a center and collar-bearing of novel construction, and of my own invention.

The end of the bar A opposite the operative mechanism is provided with a cylindrical recess. Into this is fitted a tapering bushing, $b$, into which the centered bearing $c$ is fitted.

This latter is provided with a projection at its inner end, by which means a connection longitudinally between the bearing and the bushing is maintained.

It will be readily understood that the tapering bushing and the bearing fitted thereto, as described, not only admits of the moving of the bar out of a direct line with the bearing, but also admits of its being freely revolved thereon.

My collar-bearing is exhibited in section in fig. 2, and in detail in figs. 7 and 8. It consists of a flexible metal slotted sleeve, H, of equal thickness throughout, or of greater thickness on one side than on the other, according to the shape of the chamber to be bored, provided with a projecting collar, M, at one end. This sleeve is snugly fitted to the bar A.

An adjustable griping-collar, J, fig. 8, provided with ears and drawing-screw, is arranged to encircle the thin end of the sleeve H, and, when embracing it firmly, causes a friction-connection between it and the bar A.

Between the collars M and J, a bushing, I, is fitted to the external periphery of the sleeve H.

This bushing constitutes the bearing proper, in which the bar between the cutter-head and operating mechanism is operated, and it should be provided with extension-arms, for engaging with the screw-bolts of a cylinder; or it may be attached to a cross-plate in any obvious manner.

No longitudinal movement of the bar is possible during its operation, for the sleeve H is firmly connected therewith, and the collars M and J, bearing against the fixed bushing I, maintain a rigid and positive connection therewith as against any but a rotary movement of the bar.

Should it be desirable to bore or turn out the interior of a tapering chamber, it is only essential that the sleeve H should be thicker on one side than the other, after the manner of an eccentric, in which case it is obvious that the bar in such sleeve, revolving with it, would be thrown out of line, and cause the cutters, when adjacent thereto, to describe a circle larger than their peripheral circumference, and that said circle would have a diameter equal to that of the cutter-head plus double the increased thickness of one side of the sleeve, and that the side line of such movement would be straight from the outer line of the lesser circumference at the opposite end to the outer line of the greater circumference, and constitute a true taper.

When operated with the eccentric sleeve, the tapering bushing $b$ should be used, as the proper bearing between it, the bar A, and the turned bearing $c$ can always be maintained.

A comparatively similar "out-of-line" result may be accomplished by forming the bushing $b$ eccentric, or by turning the bearings $c$ out of line, although I consider the eccentric sleeve far preferable With a a bar constructed as described, and cutter-head suited for the smallest size cylinders, it is only necessary to have sets of cutter-blocks, X, of various lengths in order to use it with any sized cylinder.

In ordinary horizontal engines, the outer cylinder-head is removed, and the piston-rod hole in the inner head serves as a bearing for the reception of the turned bearing c.

In vertical engines, a step must be provided for that end of the bar.

By having the train of gear-wheels and face-plates combined and connected, as described, they constitute one united piece of operative mechanism, which can readily, without loss of time, be removed or attached to the bar.

A means of ready attachment between the gears and the bars may or may not be employed, as desired, in the use of a steady-pin; for instance, entering the bar A at the projection u, through the annular space between the inner faces of the gears C.

Having thus described my invention,

I claim as new and desire to secure by Letters Patent—

1. Jointly, the construction of the groove $q$ in the cutter-bar with beveled sides, the construction of the lug V with beveled sides corresponding with the sides of the groove, and a screw-gib or gibs, arranged with relation thereto, by the operation of which the wear between the cutter-head and bar may be compensated, and the sides of the lug kept in close relation with the sides of the groove, substantially as shown and described.

2. The location of the cutter-blocks in the cutter-head upon journaled axes lying parallel to the axis of the cutter-bar, in order that they may be slightly oscillated on and in a plane transverse to said axes, substantially as described.

3. In combination, as described, with the bar A, the slotted sleeve H, the griping-collar J, and the bushing I, as and for the purposes set forth.

4. In combination with the cutter-bar A, the sleeve H, bushing I, collar J, bushing $b$, and spindle-bearing $c$, as and for the purposes specified.

5. In combination with the cutter-bar A, feed-screw $f$, and pinion K, the series of gear-wheels and pinions for imparting motion to said bar and screw, arranged in relation thereto and to one another, between the plates B B', substantially as described.

6. In combination with the cutter-head G, the feed-screw $f$, and the nut $e$, provided with the threaded gib $z$, and set-screw for holding said gib, as and for the purposes specified.

7. In combination with the centering devices, feed-screw, cutter-head, and gearing of a boring-machine, the cutter-bar A in two parts, as and for the purposes set forth.

JEROME WHEELOCK.

Witnesses:
   L. B. MARCH,
   GEO. H. SOUTHWICK.